United States Patent Office 3,354,176
Patented Nov. 21, 1967

3,354,176
VINYL CHLORIDE RESINS CONTAINING PLASTI-
CIZERS STABILIZED WITH HYDROXY PHENYL
PENTANOIC ACID ESTERS
Wesley D. Schroeder and Raymond J. Lawn, Pittsburgh,
Pa., assignors, by mesne assignments, to United States
Steel Corporation, Pittsburgh, Pa., a corporation of
Delaware
No Drawing. Filed Jan. 23, 1964, Ser. No. 339,597
22 Claims. (Cl. 260—31.8)

This invention relates to the stabilization of phthalate and trimellitate plasticizers in vinyl resin formulations.

It has been proposed in the past to employ bisphenol A (2,2-bis-(p-hydroxyphenyl) propane) as a stabilizer for phthalate and trimellitate plasticizers in vinyl chloride resin formulations. However, bisphenol A has a tendency to be incompatible with the plasticizers and causes blooming. Additionally, bisphenol A is a solid and it has to be melted into the plasticizer.

It is an object of the present invention to develop novel stabilizers for phthalate and trimellitate plasticizers.

Another object is to develop such stabilizers which are more compatible with plasticized vinyl chloride resins and hence exhibit less blooming.

A further object is to develop stabilizers for phthalate and trimellitate plasticized vinyl chloride resins that will improve the electrical resistivity and aging characteristics of the plasticized resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by using 0.1 to 5% of an alkyl, aryl or aralkyl ester of diphenolic acid based on the weight of the phthalate or trimellitate plasticizer. Preferably, 0.3 to 1% of the alkyl, aryl or aralkyl ester of diphenolic acid is employed.

Diphenolic acid as used in the present specification and claims is 4,4-bis (hydroxyphenyl) pentanoic acid; see Greenlee Patent 2,933,521. Esterification occurs at the carboxyl group and not at the phenolic groups of the diphenolic acid. The diphenolic acid ester of an alkanol normally has at least 6 carbon atoms in the alkyl group and preferably has 8 to 13 carbon atoms in the alkyl group. Typical examples of such esters include 2-ethylhexyl ester of diphenolic acid, n-octyl ester of diphenolic acid, isooctyl ester of diphenolic acid, n-decyl ester of diphenolic acid, isodecyl ester of diphenolic acid, n-octadecyl ester of diphenolic acid, tridecyl ester of diphenolic acid, isohexyl ester of diphenolic acid, n-hexyl ester of diphenolic acid. Aralkyl esters include the benzyl ester of diphenolic acid and phenylpropyl ester of diphenolic acid. Aryl esters include the phenyl ester of diphenolic acid, o-tolyl ester of diphenolic acid, p-tolyl ester of diphenolic acid, 2,4-xylyl ester of diphenolic acid, p-butylphenyl ester of diphenolic acid.

As the phthalate and trimellitate plasticizers there can be used dibutyl phthalate, di isooctyl phthalate, di n-octyl phthalate, di 2-ethylhexyl phthalate, butyl decyl phthalate, di isodecyl phthalate, di tridecyl phthalate, n-octyl n-decyl trimellitate, trioctyl trimellitate, tris decyl trimellitate, tris butyl trimellitate, tris tridecyl trimellitate, triisooctyl trimellitate, dioctyl isodecyl trimellitate, diisooctyl decyl trimellitate, diisodecyl isooctyl trimellitate, diisodecyl octyl trimellitate.

The plasticizer is used in an amount of 25 to 150 parts per 100 parts of vinyl chloride resin by weight.

As the vinyl chloride resin there can be used vinyl chloride homopolymers and vinyl chloride copolymers containing a predominant amount of vinyl chloride by weight. Thus, there can be used copolymers of vinyl chloride with 1 to 20% of copolymerizable materials such as vinyl acetate, vinylidene chloride, diethyl fumarate, diethyl maleate, dibutyl maleate and other dialkyl maleates and fumarates, vinyl propionate, vinyl butyrate, methyl acrylate, ethyl acrylate, butyl acrylate, octyl acrylate, ethyl methacrylate, methyl methacrylate, butyl methacrylate and other alkyl acrylates and methacrylates, methyl alpha chloroacrylate, styrene, chlorostyrene, alpha methyl styrene, p-methyl styrene, trichloroethylene, vinyl ethyl ether, butadiene, vinyl pyrrole and isobutylene. Specific examples of suitable copolymers include vinyl chloride-vinyl acetate copolymer (95:5 ratio), vinyl chloride-vinyl acetate copolymer (87:13 ratio), vinyl chloride-vinyl acetate-maleic anhydride terpolymer (86:13:1 ratio), vinyl chloride-trichloroethylene copolymer (95:5 ratio), vinyl chloride-vinylidene copolymer (95:5 ratio), vinyl chloride-diethyl fumarate copolymer (95:5 ratio).

Typical vinyl chloride homopolymers include Geon 101 (molecular weight 82,000) and Pliovic K90E (a vinyl chloride homopolymer having an inherent viscosity of 1.08, a specific gravity of 1.40 and a bulk density of 36 pounds (cubic foot)).

Unless otherwise indicated, all parts and percentages are by weight.

It has been found that the use of the diphenolic acid esters of the present invention tends to counteract the tendency of the alkyl phthalate and alkyl trimellitate plasticizers to oxidize. As a result of inclusion of the diphenolic acid esters in the vinyl chloride resin formulations, there is a better retention of elongation properties (as shown by heat aging tests) and an improvement in electrical properties. The diphenolic acid esters in many cases also are superior to the use of bisphenol A as antioxidants since they are liquids rather than solids, they are more soluble in the plasticizers and they have less tendency to spew when vinyl resin stocks are exposed to ultra-violet light.

The diphenolic acid esters can be prepared readily in the manner set forth below. Frequently, it is advantageous to make the alkyl ester of diphenolic acid simultaneously with making the alkyl phthalate or trimellitate and, hence, avoid a subsequent mixing step. Usually, a conventional acid esterification catalyst is used, e.g., sulfuric acid, toluene sulfonic acid, methane sulfonic acid, benzene sulfonic acid, hydrochloric acid, potassium acid sulfate, etc.

EXAMPLE 1 n-Decyl ester of diphenolic acid

Two mols of 4,4-bis (hydroxyphenyl) pentanoic acid, 2.2 mols of n-decyl alcohol, toluene in an amount equal to 25% of the total charge by weight and toluene sulfonic acid in an amount of 0.5% by weight of the diphenolic acid were charged to a three-necked flask fitted with an agitator, condenser and Dean Stark trap for water removal. The temperature was held at 127° to 130° C. for approximately 3.5 hours at which time 2 mols of water had been removed. The ester was neutralized at 90° C. with 500 ml. of 5% aqueous sodium carbonate. Approximately 500 ml. of water were added and then toluene in an amount equal to one-half the volume of ester was added, heat applied and separation made. The ester was washed with water to a pH of 7. The ester was then heated to 110° C. to remove the toluene and blown with steam for 3 hours. Approximately 625 grams of the n-decyl ester of diphenolic acid was obtained.

EXAMPLE 2

*2-ethylhexyl ester of diphenolic acid*

One mol of diphenolic acid, 1.1 mols of 2-ethylhexyl alcohol, toluene in an amount of 25% of the weight of the charge were heated together and after refluxing started there was added 0.6 to 0.7 gram of methane sulfonic acid dropwise as a catalyst. The temperature was maintained at 127° to 134° C. and approximately 1 mol of water was removed over an 8 hour period. The temperature was increased to 150° C. by toluene removal during an additional 8 hour cooking period. After the cooking, an equal volume of toluene was added and the ester separated and washed twice with water to a pH of 7 and then dried at 120° C. to remove the water and recover the 2-ethylhexyl ester of diphenolic acid.

EXAMPLE 3

*Di tridecyl phthalate containing 0.75% tridecyl ester of diphenolic acid*

Two mols of phthalic anhydride, 4.4 mols of tridecyl alcohol, 0.017 mol of diphenolic acid and toluene sulfonic acid in an amount of 1% of the phthalic anhydride were heated together. Approximately 3 hours were required for reaction with water removal equaling 31 ml. Upon cooling to 100° C., washing first with 250 ml. of 5% aqueous sodium carbonate and then with water, an emulsion formed. This was broken by washing smaller portions in larger volumes of water at 100° C. The ester was dried at 110° C. and filtered. The alcohol was stripped off and the ester treated with 0.5% activated carbon at 100° C. for 1.5 hours after which the ester was filtered to recover di tridecyl phthalate containing 0.75% tridecyl ester of diphenolic acid.

EXAMPLE 4

*Di isodecyl phthalate with 1% isodecyl ester of diphenolic acid*

4.0 mols of phthalic anhydride, 8.8 mols of isodecyl alcohol, 0.041 mol of diphenolic acid, a small amount of activated carbon and 1% of toluene sulfonic acid based on the phthalic anhydride were charged to a three liter reaction flask fitted with a condenser and agitator. After 3.5 hours at 150° to 160° C. the reaction was essentially complete. The ester was cooled to 90° C. and 10 grams of sodium carbonate added, the mixture stirred for 15 minutes and then filtered. The filtrate was washed neutral with 250 ml. of 5% aqueous sodium carbonate and then with water. The second water wash formed an emulsion which broke on standing overnight. The third water wash also emulsified, but upon stirring and heating to 105° C., the emulsion was broken. The ester was dried at 110° C., filtered and stripped to produce di isodecyl phthalate containing 1% of isodecyl ester of diphenolic acid.

EXAMPLE 5

*Phenylpropyl ester of diphenolic acid*

One-half mol of 4,4-bis (hydroxyphenyl) pentanoic acid, 0.55 mol of phenyl propanol, 1 gram of methane sulfonic acid, 200 ml. of toluene and 2 grams of activated carbon were charged to a three necked flask fitted with an agitator, condenser and Dean Stark trap for water removal. The reaction was carried out under a blanket of carbon dioxide. The mixture was heated for 5 hours, reaching a maximum temperature of 160° C. By the end of the reaction there were removed 11 ml. of water and most of the toluene. The product, in toluene as a solvent, was washed with aqueous sodium carbonate until a pH of 7 was reached. The toluene layer was evaporated using an aspirator and at a temperature of about 60° C. The product was then stripped free of excess alcohol at 125° C. using a film evaporator to recover the phenylpropyl ester of diphenolic acid.

EXAMPLE 6

*Benzyl ester of diphenolic acid*

One mol of 4,4-bis (hydroxyphenyl) pentanoic acid, 1.1 mols of benzyl alcohol, 101 grams of toluene and 1 ml. of methane sulfonic acid were charged into the apparatus set forth in Example 5. The mixture was heated at a temperature of 110° to 120° C. for 3.5 hours. At the end of this time 23 mol. of water had been removed. Using toluene as a solvent, the product was washed with water to a pH of 7. The toluene and excess benzyl alcohol were removed by heating the ester to 125° C. with vigorous agitation to produce the benzyl ester of diphenolic acid.

In the following examples and tests the vinyl chloride resin formulation employed had the composition:

| | Parts |
|---|---|
| Pliovic K90E resin | 168 |
| Test plasticizer | 90 |
| Tribase E (basic lead silicate sulfate) | 18 |
| Kaolin clay | 24 |
| Stearic acid | 0.42 |

This formulation is designated hereinafter as Formulation A.

Using this formulation and standard milling procedure, initially 40 mil and 20 mil sheets were prepared and pressed using conventional procedure and allowed to condition at least 24 hours at 73° F. and 50% relative humidity.

RETENTION OF ELONGATION TESTING

The pressed sheet was cut into dumbbell specimens, weighed and placed in a Royen forced draft oven with an air flow of 400 feet per minute. The temperature and length of exposure were established to conform as nearly as possible to the requirements of various coated wire specifications. After exposure, the samples were allowed to cool, re-weighed, and then conditioned for at least 24 hours at 73° F. and 50% relative humidity. Using a Scott Tensile Tester (horizontal), the specimens, both aged and original, were broken and the tensile strength, modulus of elasticity and percent of elongation recorded.

ELECTRICAL TESTING

Sheets approximately 40 mils thick were prepared and allowed to condition for at least 24 hours at 73° F. and 50% relative humidity. These sheets were then cut into 4.5 inch circles, sized for average thickness, and 3 inch circles on both sides painted with silver paint. After conditioning again for at least 72 hours at 73° F. and 50% relative humidity, they were tested, in duplicate, at 23° C. and 95° C., respectively, by applying 500 volts and measuring the resistance.

In the following examples the percent of bisphenol A or of the ester of diphenolic acid are based on the weight of the indicated test plasticizer.

EXAMPLE 7

The test plasticizer in Formulation A was ditridecyl phthalate (PX-126). The test was carried out at 136° C. for 7 days.

|  | Percent addition bisphenol A | | | | Percent addition 2-ethylhexyl ester of diphenolic acid | | | | Percent addition n-decyl ester of diphenolic acid | | |
|---|---|---|---|---|---|---|---|---|---|---|---|
|  | 0.0 | 0.4 | 0.5 | 0.75 | 0.3 | 0.4 | 0.5 | 0.75 | 0.4 | 0.5 | 0.75 |
| Sample | 1 | 2 | 3 | 4 | 5 | 6 | 7 | 8 | 9 | 10 | 11 |
| Film Thickness (mils) | 20.5-23.5 | 19.5 | 20.5-22.5 | 20.5-22.5 | 22-23 | 21-23.5 | 20.5-22 | 20.5-21 | 21 | 21.5 | 21.5 |
| Percent Retention Elongation | 20 | 28.0 | 26.5 | 30.4 | 32.8 | 48.8 | 51.8 | 31.0 | 28.0 | 56.0 | 47.0 |
| Percent Weight Loss | 11.0 | 11.2 | 13.8 | 13.4 | 9.4 | 10.1 | 10.2 | 14.0 | 12.3 | 10.8 | 10.6 |
| Film Thickness (mils) |  | 41.5 | 42-44.5 | 42-44.5 | 42-46 | 42-46 | 42-43 | 43-44.5 | 41.5 | 43.5 | 42.3 |
| Percent Retention Elongation |  | 67.0 | 52.7 | 50.8 | 40.7 | 58.3 | 43.3 | 66.7 | 56.0 | 43.0 | 47.0 |
| Percent Weight Loss |  | 8.5 | 6.7 | 8.3 | 5.7 | 5.9 | 9.4 | 5.2 | 9.3 | 9.8 | 7.9 |

The slab resistance of Formulation A at a thickness of essentially 40 mils is given in the following table. The initials EHDPE stand for 2-ethylhexyl ester of diphenolic acid and bis A stands for bisphenol A (2,2 di (p-hydroxyphenyl) propane).

indicated, was a commercially available material obtained from S. C. Johnson & Sons.

EXAMPLE 8

The test plasticizer in Formulation A was n-octyl, n-decyl trimellitate (PX-336). The test was carried out at 136° C. for 7 days.

|  | Percent Addition bisphenol A | | | | | | | Percent Addition EHDPE | | | | | |
|---|---|---|---|---|---|---|---|---|---|---|---|---|---|
|  | 0.0 | 0.4 | 0.5 | 0.75 | 1.0 | 1.5 | 2.0 | 0.4 | 0.5 | 0.75 | 1.0 | 1.5 | 2.0 |
| Sample | 1 | 2 | 3 | 4 | 5 | 6 | 7 | 8 | 9 | 10 | 11 | 12 | 13 |
| Film Thickness (mils) | 22-24.5 | 20.5 | 20.5 | 20.5 | 18-19 | 19 | 20 | 20.5 | 20.5 | 23 | 19-20 | 20 | 19-20 |
| Percent Retention Elongation | 79.3 | 98 | 102 | 95 | 92.5 | 91 | 90 | 100 | 107 | 102 | 101 | 94 | 92.5 |
| Percent Weight Loss | 3.0 | 2.0 | 2.3 | 2.0 | 2.5 | 2.7 | 2.7 | 1.9 | 1.8 | 1.8 | 2.7 | 2.3 | 2.6 |
| Film Thickness (mils) |  | 41.5 | 41.5 | 41.5 |  |  |  | 41.5 | 42 | 42 |  |  |  |
| Percent Retention Elongation |  | 97 | 95 | 92 |  |  |  | 97 | 97 | 102 |  |  |  |
| Percent Weight Loss |  | 1.8 | 1.8 | 1.7 |  |  |  | 1.7 | 1.6 | 1.7 |  |  |  |

DIRECT CURRENT RESISTIVITY (DCR)

| Sample | Percent Additive | At 23° C., (ohm-cm.×10$^{14}$) | At 95° C., (ohm-cm.×10$^{11}$) |
|---|---|---|---|
| 12 | 0.2 EHDPE | 2.9 | 1.8 |
| 13 | 0.3 EHDPE | 2.6 |  |
| 14 | 0.4 EHDPE | 2.2 | 1.8 |
| 15 | 0.5 EHDPE | 2.7 |  |
| 16 | bis A | 3.6 | 1.8 |

Although the use of bisphenol A with PX-336 in the formulation had very good retention of elongation properties, it is clear that the substitution of the 2-ethylhexyl ester of diphenolic acid resulted in consistently better retention of elongation values.

EXAMPLE 9

The test plasticizer in Formulation A was trioctyl trimellitate (PX-338). The test was carried out at 136° C. for 7 days.

|  | Percent Addition bisphenol A | | | | Percent Addition EHDPE | | |
|---|---|---|---|---|---|---|---|
|  | 0.0 | 0.4 | 0.5 | 0.75 | 0.4 | 0.5 | 0.75 |
| Sample | 1 | 2 | 3 | 4 | 5 | 6 | 7 |
| Film Thickness (mils) | 21.5-24.5 | 21.5 | 22 | 22.5 | 22.5 | 22 | 22 |
| Percent Retention Elongation | 57 | 80 | 88 | 94 | 88 | 95 | 89 |
| Percent Weight Loss | 4.9 | 5.1 | 4.6 | 3.5 | 3.6 | 3.2 | 3.1 |
| Film Thickness (mils) |  | 43 | 42 | 43.5 | 43 | 42.5 | 43 |
| Percent Retention Elongation |  | 91 | 87 | 94 | 89 | 95 | 85 |
| Percent Weight Loss |  | 2.3 | 3.5 | 2.6 | 3.0 | 2.7 | 2.3 |

The compounds of the present invention were thus able to be used in place of bisphenol A without hurting any of the properties of the vinyl resin formulation while at the same time having the advantages previously set forth.

The 2-ethylhexyl ester of diphenolic acid employed in this example and in the other examples, unless otherwise

EXAMPLE 10

The test plasticizer in Formulation A was diisooctyl phthalate (PX-108). The test was carried out at 100° C. for 7 days in Table 1, and 3 days in Table 2.

TABLE 1

| | Percent Addition bisphenol A | | | | Percent Addition EHDPE | | |
|---|---|---|---|---|---|---|---|
| | 0.0 | 0.4 | 0.5 | 0.75 | 0.4 | 0.5 | 0.75 |
| Sample | 1 | 2 | 3 | 4 | 5 | 6 | 7 |
| Thickness (mils) | | 20.5–22 | 22–23 | 19–20 | 22–23 | 22–23 | 18–20 |
| Percent Retention Elongation | | 7.7 | 7.7 | 23 | 14 | 40 | 23 |
| Percent Weight Loss | | 17.5 | 15.3 | 13.8 | 15.0 | 11.5 | 13.8 |

TABLE 2

| | Percent Addition bisphenol A | | | | Percent Addition EHDPE | | |
|---|---|---|---|---|---|---|---|
| | 0.0 | 0.4 | 0.5 | 0.75 | 0.4 | 0.5 | 0.75 |
| Sample | 1 | 2 | 3 | 4 | 5 | 6 | 7 |
| Thickness (mils) | 20–22 | 19.2–23.5 | 20–24.5 | 19.5–20.5 | 20–24 | 20.5–23 | 16.5–19.5 |
| Percent Retention Elongation | 72 | 67 | 60 | 91 | 98 | 86 | 85 |
| Percent Weight Loss | 4.7 | 5.3 | 6.3 | 5.5 | 4.2 | 3.3 | 4.0 |

It will be observed that the use of the 2-ethylhexyl ester of diphenolic acid showed considerable improvement over the use of bisphenol A in the lower and medial concentrations.

The results with the 2-ethylhexyl ester of diphenolic acid were consistently superior to those with bisphenol A at the same concentration.

EXAMPLE 11

The test plasticizer in Formulation A was dioctyl phthalate (PX–138). The test was carried out at 100° C. for 7 days in Table 3, and 3 days in Table 4.

EXAMPLE 12

The test plasticizer in Formulation A was diisodecyl phthalate (PX–120). The test was carried out at 121° C. for 7 days.

| | Percent Addition bisphenol A | | | Percent Addition EHDPE | | |
|---|---|---|---|---|---|---|
| | 0.4 | 0.5 | 0.75 | 0.4 | 0.5 | 0.75 |
| Sample | 1 | 2 | 3 | 4 | 5 | 6 |
| Thickness (mils) | 20.5–21.5 | 21–22 | 21–22.5 | 20–21 | 20.5 | 22–23 |
| Percent Retention Elongation | 0 | 7.8 | 6 | 32 | 12 | 30 |
| Percent Weight Loss | 19.1 | 16.0 | 17.6 | 14.8 | 15.3 | 18.9 |

The resistance of Formulation A at a thickness of 40 mils is given in the following table.

TABLE 3

| | Percent Addition bisphenol A | | | Percent Addition EHDPE | | |
|---|---|---|---|---|---|---|
| | 0.4 | 0.5 | 0.75 | 0.4 | 0.5 | 0.75 |
| Sample | 1 | 2 | 3 | 4 | 5 | 6 |
| Thickness (mils) | 22–23 | 22–23 | 21–22 | 22–23 | 22 | 22.5–24.5 |
| Percent Retention Elongation | 3 | 31 | 14 | 27.5 | 42.5 | 42.5 |
| Percent Weight Loss | 18.9 | 14.7 | 17.6 | 15.4 | 14.3 | 13.2 |

TABLE 4

| | Percent Addition bisphenol A | | | Percent Addition EHDPE | | |
|---|---|---|---|---|---|---|
| | 0.4 | 0.5 | 0.75 | 0.4 | 0.5 | 0.75 |
| Sample | 1 | 2 | 3 | 4 | 5 | 6 |
| Thickness (mils) | 20.8–26 | 21.5–23.5 | 20.5–23.5 | 21.8–24.6 | 20.5–23.5 | 22.5–25 |
| Percent Retention Elongation | 63 | 91 | 64 | 80 | 95 | 88 |
| Percent Weight Loss | 7.3 | 5.7 | 7.8 | 5.9 | 4.9 | 6.7 |

| Sample | Percent Additive | DCR at 23° C. (ohm-cm.×10¹⁴) | DCR at 95° C. (ohm-cm.×10¹¹) |
|---|---|---|---|
| 7 | 0.25 bis A | 3.2 | 4.6 |
| 8 | 0.50 bis A | 1.8 | 2.2 |
| 9 | 0.25 EHDPE | 2.7 | 4.2 |
| 10 | 0.50 EHDPE | 2.6 | 3.7 |

EXAMPLE 13

The test plasticizer in Formulation A was diisodecyl phthalate (PX–120). The test was carried out at 120° C. for 7 days.

| | Percent Addition bisphenol A | | | Percent Addition Phenyl Ester of Diphenolic Acid | | | Percent Addition Benzyl Ester of Diphenolic Acid | | |
|---|---|---|---|---|---|---|---|---|---|
| | 0.25 | 0.50 | 0.75 | 0.25 | 0.50 | 0.75 | 0.25 | 0.50 | 0.75 |
| Sample | 1 | 2 | 3 | 4 | 5 | 6 | 7 | 8 | 9 |
| Thickness (mils) | 40 | 40 | 40 | 40 | 40 | 40 | 40 | 40 | 40 |
| Percent Retention Elongation | 48 | 24 | 59 | 49 | 55 | 72 | 39 | 40 | 50 |
| Percent Weight Loss | 12.2 | 12.9 | 10.6 | 11.9 | 12.2 | 9.6 | 12.5 | 11.3 | 10.3 |

The slab resistance of Formulation A at a thickness of essentially 40 mils is given in the following table. The initials PP stand for phenylpropyl ester of diphenolic acid, the initials BD stand for benzyl ester of diphenolic acid and bis A stands for bisphenol A.

| Sample | Percent Additive | DCR at 23° C. (ohm-cm.×10¹⁴) | DCR at 95° C. (ohm-cm.×10¹¹) |
|---|---|---|---|
| 10 | 0.25 bis A | 2.0 | 1.4 |
| 11 | 0.50 bis A | 1.6 | 1.5 |
| 12 | 0.75 bis A | 1.7 | 1.4 |
| 13 | 0.75 PP | 1.7 | 1.7 |
| 14 | 0.50 PP | 1.6 | 1.4 |
| 15 | 0.75 PP | 1.1 | 1.2 |
| 16 | 0.75 BD | 2.2 | 1.4 |
| 17 | 0.50 BD | 1.5 | 1.3 |
| 18 | 0.75 BD | 1.2 | 1.2 |

EXAMPLE 14

The test plasticizer in Formulation A was trioctyl trimellitate (PX–338). The test was carried out at 120° C. for 7 days.

| | Percent Addition Bisphenol A | | | | | | Percent Addition Phenylpropyl Ester of Diphenolic Acid | | | | | | Percent Addition Benzyl Ester of Diphenolic Acid | | | | | |
|---|---|---|---|---|---|---|---|---|---|---|---|---|---|---|---|---|---|---|
| | 0.25 | 0.50 | 0.75 | 0.25 | 0.50 | 0.75 | 0.25 | 0.50 | 0.75 | 0.25 | 0.50 | 0.75 | 0.25 | 0.50 | 0.75 | 0.25 | 0.50 | 0.75 |
| Sample | 1 | 2 | 3 | 4 | 5 | 6 | 7 | 8 | 9 | 10 | 11 | 12 | 13 | 14 | 15 | 16 | 17 | 18 |
| Thickness (mils) | 20 | 20 | 20 | 40 | 40 | 40 | 20 | 20 | 20 | 40 | 40 | 40 | 20 | 20 | 20 | 40 | 40 | 40 |
| Percent Retention Elongation | 70 | 88 | 81 | 88 | 95 | 93 | 90 | 87 | 85 | 107 | 86 | 98 | 92 | 94 | 82 | 98 | 89 | 90 |
| Percent Weight Loss | 4.7 | 3.4 | 2.8 | 2.3 | 2.1 | 2.3 | 3.3 | 3.2 | 3.1 | 1.8 | 2.0 | 2.2 | 3.3 | 2.5 | 3.6 | 3.3 | 2.2 | 2.5 |

The slab resistance of Formulation A at a thickness of essentially 40 mils is given in the following table. The initials PP, BD and bis A have the same significance as in Example 13.

| Sample | Percent Additive | DCR at 23° C. (ohm-cm.×10¹⁴) | DCR at 95° C. (ohm-cm.×10¹¹) |
|---|---|---|---|
| 19 | 0.25 bis A | 5.2 | 2.7 |
| 20 | 0.50 bis A | 6.1 | 2.3 |
| 21 | 0.75 bis A | 5.8 | 2.4 |
| 22 | 0.25 PP | 6.6 | 2.6 |
| 23 | 0.50 PP | 5.4 | 2.6 |
| 24 | 0.75 PP | 4.6 | 2.8 |
| 25 | 0.25 BD | 6.2 | 2.9 |
| 26 | 0.50 BD | 5.2 | 3.0 |
| 27 | 0.75 BD | 5.0 | 2.7 |

The results obtained in Example 13 show that the phenylpropyl ester of diphenolic acid is more effective than bisphenol A in retention of elongation on heat aging properties in diisodecyl phthalate plasticized polyvinyl chloride and that the benzyl ester of diphenolic acid is about the same as bisphenol A in this respect.

The results obtained in Example 14 show that both the phenyl propyl ester of diphenolic acid and the benzyl ester of diphenolic acid are more effective than bisphenol A in retention of elongation on heat aging properties in trioctyl trimellitate at 20 mil thickness and that the phenyl propyl ester is better than bisphenol A in the 40 mil thickness while the benzyl ester is about equal to bisphenol A in the 40 mil thickness.

The results obtained in Examples 13 and 14 show the slab resistivities of phenylpropyl and benzyl diphenolic esters are equivalent to those of bisphenol A.

We claim:

1. A vinyl chloride resin composition containing a vinyl chloride resin selected from the group consisting of homopolymers of vinyl chloride and copolymers in which the vinyl chloride constitutes at least 80%, a plasticizer selected from the group consisting of dialkyl phthalate and di and tri alkyl trimellitates and also containing a small amount of a member of the group consisting of alkyl, phenyl, alkyl substituted phenyl, and phenylalkyl esters of 4,4-bis (hydroxyphenyl) pentanoic acid based on the weight of plasticizer and wherein the alkyl groups of the plasticizer have 4 to 13 carbon atoms.

2. A composition according to claim 1 wherein the ester of 4,4-bis (hydroxyphenyl) pentanoic acid is used in an amount of 0.1 to 5% by weight of the plasticizer.

3. A composition according to claim 2 wherein said ester is an alkyl ester and all alkyl groups of the stabilizing ester and the plasticizer have 6 to 18 carbon atoms.

4. A composition according to claim 3 wherein all alkyl groups have 8 to 13 carbon atoms.

5. A vinyl chloride resin composition comprising a vinyl chloride resin selected from the group consisting of homopolymers of vinyl chloride and copolymers in which the vinyl chloride constitutes at least 80%, a dialkyl phthalate as a plasticizer therefor having 4 to 13 carbon atoms in the alkyl group and 0.1 to 5% of an alkyl ester of diphenolic acid based on the weight of the phthalate, said ester having 6 to 13 carbon atoms in the alkyl group.

6. A composition according to claim 5 wherein all the alkyl groups of the stabilizing ester and the plasticizer have 8 to 13 carbon atoms.

7. A composition according to claim 5 wherein the diphenolic acid ester is used in an amount of 0.3 to 0.75% by weight of the phthalate.

8. A composition according to claim 5 wherein the alkyl group of the diphenolic acid ester has 8 carbon atoms.

9. A vinyl chloride resin composition comprising a vinyl chloride resin selected from the group consisting of homopolymers of vinyl chloride and copolymers in which the vinyl chloride constitutes at least 80%, an alkyl trimellitate having 2 to 3 alkyl groups as a plasticizer therefor, said alkyl groups having 4 to 13 carbon atoms, and 0.1 to 5% of an alkyl ester of diphenolic acid based on the weight of the trimellitate, said alkyl ester having 6 to 13 carbon atoms in the alkyl group.

10. A composition according to claim 9 wherein all the alkyl groups of the stabilizing ester and the plasticizer have 8 to 13 carbon atoms.

11. A composition according to claim 10 wherein the diphenolic acid ester is used in an amount of 0.3 to 0.75% by weight of the trimellitate.

12. A composition according to claim 11 wherein the trimellitate is a trioctyl trimellitate.

13. A composition according to claim 11 wherein the trimellitate is a trialkyl trimellitate.

14. A composition comprising (1) a member of the group consisting of dialkyl phthalates and di and tri alkyl trimellitates and (2) 0.1 to 5% of an alkyl ester of diphenolic acid based on the weight of said member.

15. A composition according to claim 14 wherein all alkyl groups contain 8 to 13 carbon atoms.

16. A composition comprising a dialkyl phthalate having 4 to 13 carbon atoms in the alkyl groups and an alkyl ester of diphenolic acid having 6 to 13 carbon atoms in the alkyl group in an amount of 0.1 to 5% by weight of the dialkyl phthalate.

17. A composition according to claim 16 wherein all alkyl groups of the stablizing ester and the plasticizer are alike and contain 8 to 13 carbon atoms.

18. A vinyl chloride resin composition containing a vinyl chloride resin selected from the group consisting of homopolymers of vinyl chloride and copolymers in which the vinyl chloride constitutes at least 80%, a plasticizer selected from the group consisting of dialkyl phthalates and di and tri alkyl trimellitates, all of the alkyl groups containing 4 to 13 carbon atoms, and also containing a small amount of an aralkyl ester of 4,4-bis (hydroxyphenyl) pentanoic acid based on the weight of the plasticizer.

19. A composition according to claim 18 wherein the aralkyl is a phenylalkyl group having 1 to 3 carbon atoms in the alkyl portion thereof and the phenylalkyl ester is used in an amount of 0.1 to 5% by weight of the plasticizer.

20. A composition according to claim 19 wherein the alkyl groups of the plasticizer have 8 to 13 carbon atoms.

21. A composition according to claim 20 wherein the aralkyl ester is the phenylpropyl ester of 4,4-bis (hydroxyphenyl) pentanoic acid.

22. A composition containing a vinyl chloride resin, a plasticizer selected from the group consisting of dialkyl phthalate and di and tri alkyl trimellitates and also containing a small amount of a member of the group consisting of alkyl, aryl and aralkyl esters of 4,4-bis (hydroxyphenyl) pentanoic acid based on the weight of plasticizer.

References Cited

UNITED STATES PATENTS

| | | | |
|---|---|---|---|
| 2,510,035 | 5/1950 | Mack | 260—31.8 |
| 2,766,273 | 10/1956 | Bruins et al. | 260—475 |
| 3,043,792 | 7/1962 | Hurwitz | 260—31.8 |
| 3,075,940 | 1/1963 | Pazinski et al. | 260—31.8 |
| 3,124,555 | 3/1964 | Bown et al. | 260—45.95 |

OTHER REFERENCES

Chemical Abstracts, vol. 57, column 11, 396a: "Stabilization of Polyolefins," May 1962, Scientific Library, QD 1A51.

MORRIS LIEBMAN, *Primary Examiner.*

L. T. JACOBS, *Assistant Examiner.*